(12) United States Patent
Takamiya

(10) Patent No.: US 6,448,972 B1
(45) Date of Patent: Sep. 10, 2002

(54) SYSTEM AND METHOD FOR RANDOMLY GENERATING CONTENT PARAMETERS IN A COMPUTER GRAPHICS ENVIRONMENT

(75) Inventor: Koji Takamiya, Tokyo (JP)

(73) Assignee: Tecmo LTD, Tokyo (JP)

( * ) Notice: Subject to any disclaimer, the term of this patent is extended or adjusted under 35 U.S.C. 154(b) by 0 days.

(21) Appl. No.: 09/173,973

(22) Filed: Oct. 16, 1998

(30) Foreign Application Priority Data

Oct. 17, 1997 (JP) .............................. 9-303671

(51) Int. Cl.[7] .................................. G09G 5/39
(52) U.S. Cl. ..................... 345/531; 345/536; 463/43
(58) Field of Search ................. 345/501, 531, 345/536; 711/102, 103; 463/43–45, 30–34

(56) References Cited

U.S. PATENT DOCUMENTS 6,163,319 A * 12/2000 Peercy et al. ............... 345/426

FOREIGN PATENT DOCUMENTS

JP 6-86870 3/1994

* cited by examiner

*Primary Examiner*—Kee M. Tung
(74) *Attorney, Agent, or Firm*—Christie, Parker & Hale, LLP

(57) ABSTRACT

A method of extracting data for use in an interactive computer graphical environment. The graphical environment is generated by a computer responsive to software residing on a first removable memory having a predetermined data format. The method includes the steps of randomly selecting a second memory having a substantially similar data format to the predetermined data format; reading data signals from the selected second memory indicative of the content thereon; and processing the read data signals to represent parameter content in the graphical environment.

10 Claims, 6 Drawing Sheets

SYSTEM AND METHOD FOR RANDOMLY GENERATING CONTENT PARAMETERS IN A COMPUTER GRAPHICS ENVIRONMENT

FIELD OF THE INVENTION

The invention relates to a system and method for extracting data signals from a randomly selected memory medium to represent content parameters in an interactive computer graphics environment.

BACKGROUND OF THE INVENTION

Optical memories such as compact-disc-read-only-memories (CD-ROMs) have gained wide acceptance in many computer applications requiring inexpensive and compact data storage devices. Generally, data written to a CD-ROM is format-specific, i.e., audio data on an audio CD-ROM is often primarily used for audio playback purposes. Additionally, individual CD-ROMs typically include Table-of-Content (TOC) data that identify several unique characteristics of the specific CD-ROM. TOC data often includes the overall number of data tracks, the total running time of all tracks, the running time of each individual track, and so on. Consequently, the TOC data for an individual CD-ROM serves somewhat as a fingerprint for unique identification thereof.

In an effort to utilize the data on an audio CD-ROM for a non-audio purpose, Japanese Patent Laid-open Publication No. 8-86870 proposes making use of the TOC data for computer gaming applications. The Publication discloses a game system that operates according to hard-coded software instructions pre-loaded into a permanently mounted memory. The game system reads the TOC data from an audio CD-ROM inserted into a CD-ROM player with a subcode processing circuit. Data read from the disc is stored in a TOC memory, and then converted by a control unit into game character parameters such as energy Capacity, offensive power, and defensive power. The system further includes an attack key that when activated, executes a character battle game by the control unit according to predetermined instructions hard-coded in the device. The method manipulates the energy capacity, offensive firepower and defensive power as variables, with the computational battle result displayed on a display screen.

While the foregoing device and method work well for its intended purpose, the hard-coding of the game software limits the gaming experience to only one game. This substantially minimizes any variety in the gaming experience. Moreover, the disclosed device appears specially constructed for the particular gaming scenario, and non-adaptable to generic gaming systems.

Therefore, the need exists for a system and method having the ability of extracting parameter data from a randomly selected removable memory, for subsequent use by computer content stored on a memory medium of the type comprising the selected removable memory. The system and method of the present invention satisfy these needs.

SUMMARY OF THE INVENTION

The system and method of the present invention offer the capability of extracting data from a randomly selected removable memory. The extracted data maximizes the flexibility and variety of the content in an interactive computer graphics environment. Additionally, the randomly selected memory may be read by a generic game system without the need for modifications.

To realize the above advantages, in one form the invention comprises a method of extracting random data for use in an interactive computer graphics environment. The graphics environment is generated by a computer responsive to software residing on a first removable memory having a predetermined data format. The method includes the steps of selecting a second memory having a substantially similar data format to the predetermined data format; reading data signals from the randomly selected second memory indicative of the content thereon; and processing the read data signals to represent parameter content in the graphical environment.

In another form, the invention comprises a method of randomly generating content parameters for use by a computer. The computer includes a reader for receiving a first removable memory including predetermined computer content. The reader is operative in response to the content to generate a computer graphics environment. The method includes the steps of first selecting a second removable memory including data representative of the formatting characteristics of the second memory; temporarily replacing the first removable memory in the optical reader with the second memory; extracting the formatting data from the second memory with the reader; processing the extracted data to create parameter values for use by the computer content; and substituting the second memory with the first memory in the reader to continue processing of the computer content.

In yet another form, the invention comprises a system for displaying computer content on a graphics display. The computer content is resident on a first removable memory. The system includes a reader operative to read data signals from the first removable memory comprising the computer content. The reader is responsive to instructions in the computer content to extract organizational data signals from a randomly selected second removable memory. A processor is coupled to the reader for generating parameter data from the extracted organizational data signals for use in the computer content.

Other features and advantages of the present invention will be apparent from the following detailed description when read in conjunction with the accompanying drawings.

DETAILED DESCRIPTION OF THE INVENTION

Figure 1:
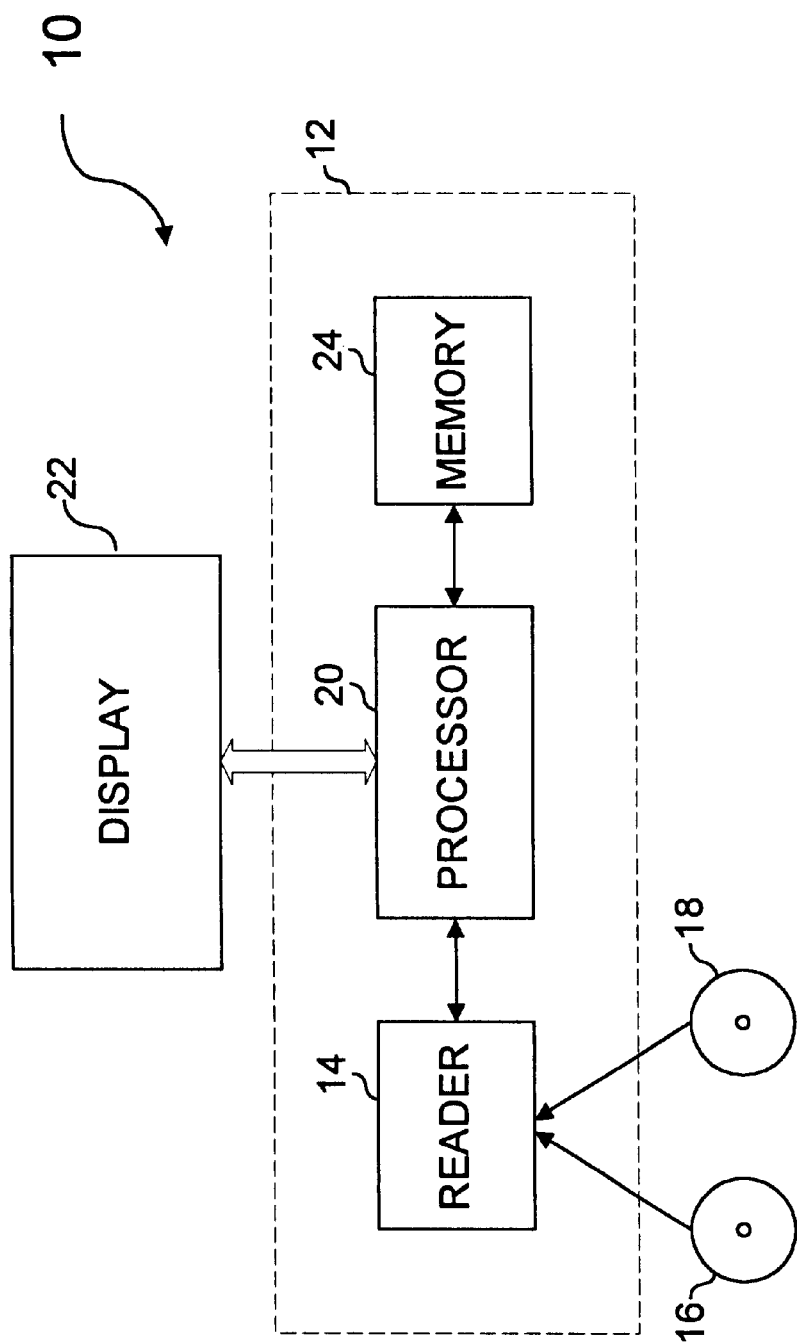
FIG. 1 is a block diagram of a system according to one embodiment of the present invention.

Referring now to FIG. 1, the present invention, according to one embodiment, generally designated 10, employs a computer 12 adapted for displaying gaming content from a first removable memory 16, and extracting random parameter data from a second removable memory 18 to provide flexible and variable parameter conditions on a display 22.

The computer 12 is preferably of the type utilized for interactive gaming, such as the generic gaming machine manufactured by Sony, and sold under the Trademark "PLAYSTATION." The computer includes a reader 14, such as a CD-ROM player, adapted to receive and read data from the respective first and second removable memories 16 and 18. The reader is coupled to a processor 20 that generates interactive computer content on the display 22. A mass memory 24 is connected to the processor for storing selected data prior to processing.

The first removable memory 16 is of a format compatible with the reader 14 and preferably comprises a CD-ROM having programmed content corresponding to a desired gaming environment. The environment employs respective computer characters that exhibit a plurality of characteristics or parameters. A portion of the programmed content resident on the first removable memory comprises instructions and data tables that carry out steps to randomly generate data representative of the character parameters according to the method of the present invention, as more fully described below.

The second removable memory 18 preferably comprises a memory medium of the same format as the first removable memory 16 to enable the reader 14 to extract data therefrom. The second memory must include the unique organizational information for the data on the memory, such as header or TOC data. This invention, however, is not only limited to CD-ROMs but also encompasses later technology of removable memory.

Figure 2:
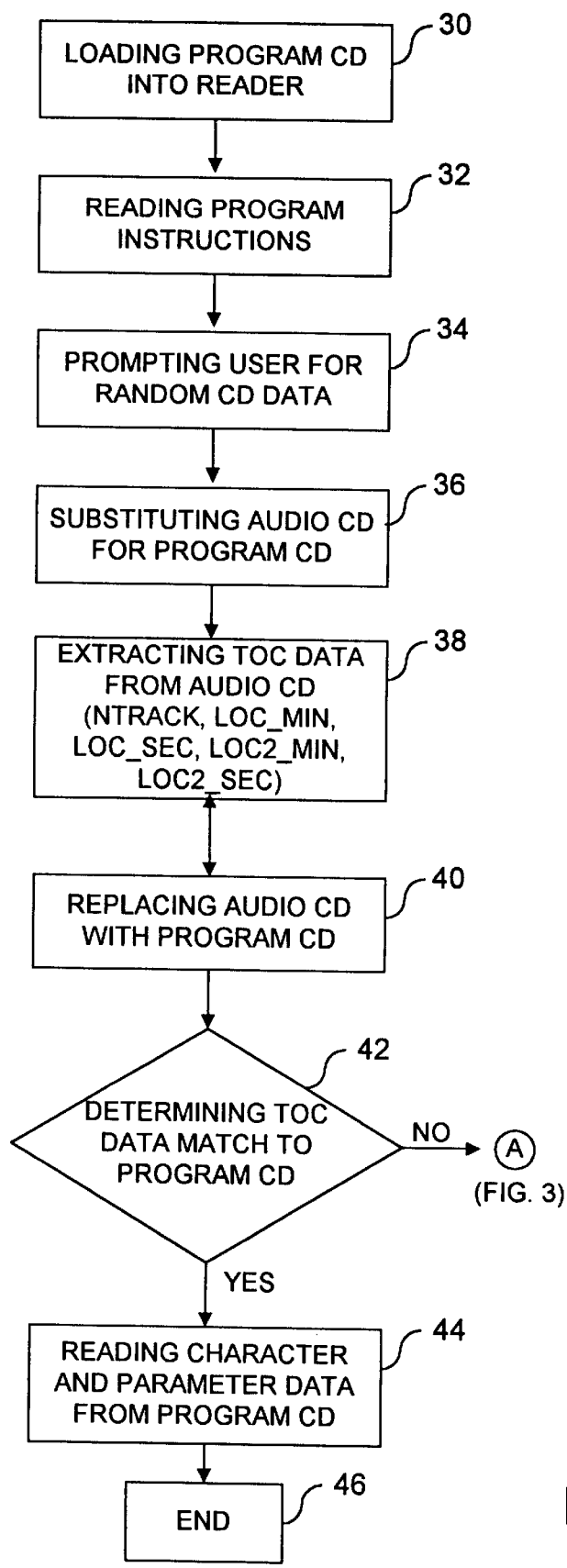
FIG. 2 is a flowchart illustrating steps employed by a method according to one embodiment of the present invention.

Referring now to FIG. 2, in operation, a user desiring to access the computer gaming content of the present invention begins by loading the first CD-ROM 16 into the CD-ROM player, or reader 14, at step 30. The reader extracts selected instructions from the disc, at step 32, which are processed by the processor 20 to generate initial prompts on the display 22 for instructing the user in carrying out specific tasks.

The initial prompts for the user involve creation of controllable computer characters for use in the gaming environment. Each character comprises a plurality of respective parameters that are classified into lineage parameters and capacity parameters. The game employs twelve genuine game characters that may be manipulated into various combinations to define a "custom" character. The lineage of a single game character comprises a combination of two lineages, i.e., a main-lineage and a sub-lineage. The game makes available twelve main-lineages and twelve sub-lineages to account for a total of one-hundred-forty-four different combinations of game character lineages. The game character lineages are then replaced by numerals which represent lineage parameters. Additionally, capacity parameters such as a character's life, power, toughness, hit, evasion, and balance recovery speed are included.

To capture random data for use by the gaming program in developing the character parameters, the user is prompted, at step 34, to randomly select a second CD-ROM 18, such as an audio CD-ROM. The program then instructs the user to substitute the second disc 18 for the first CD-ROM 16, at step 36, in the reader 14. Once the second disc is properly positioned, the reader extracts the TOC data, at step 38, and stores the data in the mass memory 24.

The TOC data stored in the mass memory 24 includes values for the total number of tracks (NTRACK) on the second CD-ROM, the total number of audio minutes (LOC_MIN), and the number of remainder seconds (LOC_SEC) associated with the total time. Additionally, the extracted TOC data includes the duration in minutes of the second audio track (LOC2_N), and the remaining seconds of the second track (LOC2_SEC).

For example, an audio CD-ROM having a total duration of 68 minutes and 53 seconds will include in its TOC data respective values for LOC_MIN and LOC_SEC as "68" and "53". Additionally, for a second track having a duration of 3 minutes and 15 seconds, the respective values for LOC2_MIN and LOC2_SEC are "3" and "15".

Following extraction of the TOC data, the user is prompted to replace the second CD-ROM 18 with the first disc 16, at step 40. In the disclosed embodiment, the TOC data is then compared to a set of predetermined values, at step 42, to determine whether the TOC data matches the predetermined data. If the values match, then the character data and parameter data of the game character are automatically read from the program CD-ROM 16, at step 44. If the values do not match, then a series of random parameter value processing steps takes place.

Figure 3:
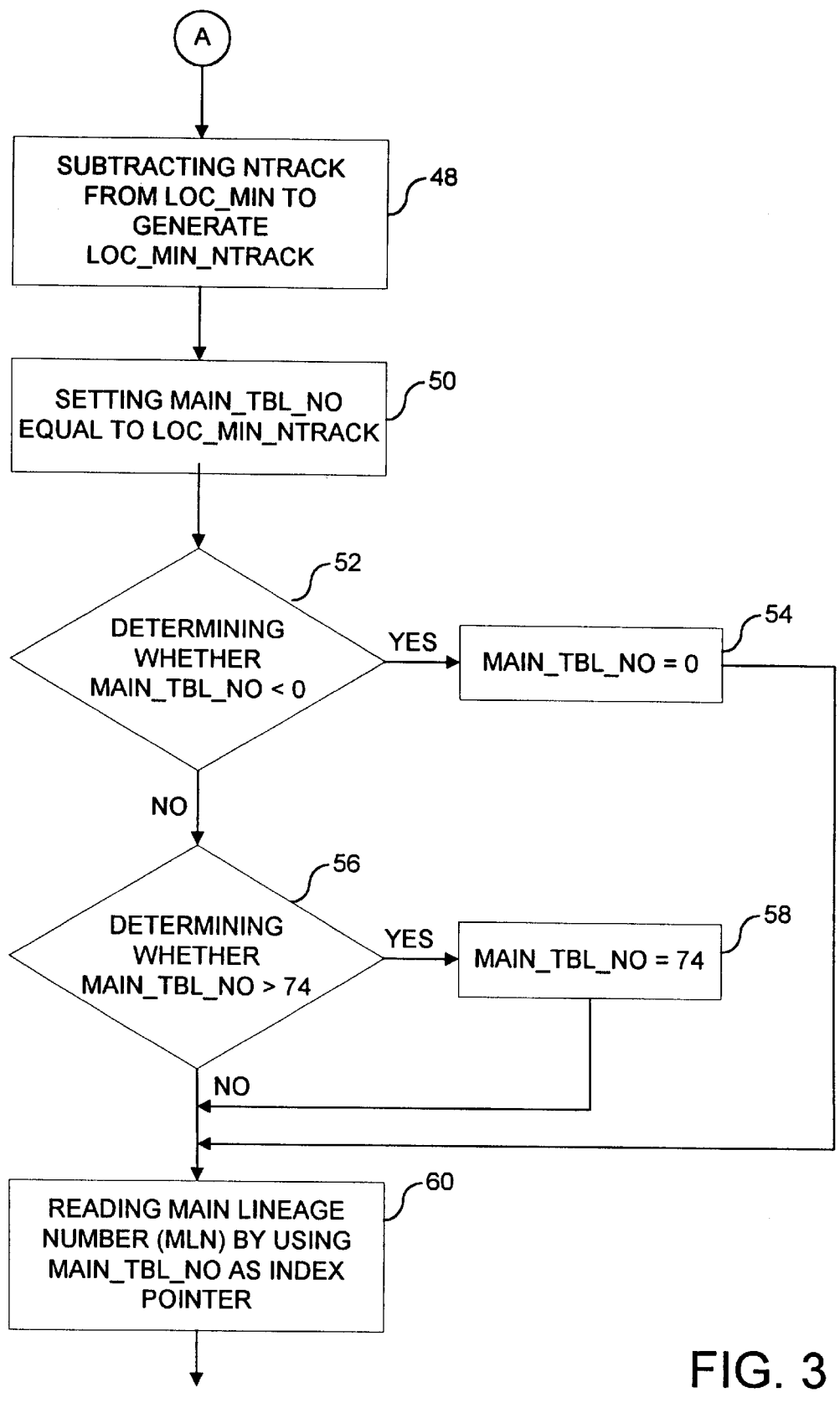
FIG. 3 is a flowchart including additional steps to those shown in FIG. 2.

The random parameter value processing steps generally transform the extracted TOC data signals, from step 38, into other usable values in the gaming environment represented by the notations MAIN_TBL_NO, SUB_TBL_NO, PARA_TBL_NO, and PARA_TBL_N02. Referring now to FIG. 3, the random parameter value processing begins by subtracting the number of tracks NTRACK from the total number of minutes LOC_MIN to generate a new value LOC_MIN_NTRACK, at step 48. MAIN_TBL_NO is then set to the new value LOC_MIN_NTRACK, at step 50. A determination is made, at step 52, whether MAIN_TBL_NO is less than zero. If so, then MAIN_TBL_NO is set to zero, at step 54. If not, then a second determination is made, at step 56, whether MAIN_TBL_NO is greater than seventy-four. If so, then MAIN_TBL_NO is set to seventy-four, at step 58. If MAIN_TBL_NO is not greater than seventy-four and not less than zero, then the value for MAIN_TBL_NO remains unmodified. The range of zero to seventy-four means that there are seventy-five allowable values for MAIN_TBL_NO, that is, zero, one, two, . . . , and seventy-four. This procedure serves as an error handling process to ensure that MAIN_TBL_NO contains a valid value, and may be applied when an error is detected, or when the inserted medium 18 contains no TOC data. Additionally, the process may be adapted to establish any predetermined numerical value in the range of zero to seventy-four when an error is detected. Using MAIN_TBL_NO as an index pointer, at step 60, a main-lineage number (MLN) is then read from an existing predefined data table containing possible main-lineage values usable in the gaming environment. The predefined table of main-lineage values contains values from a predefined range, such as 0 to 11 to account for the twelve main-lineage numbers available in the game. For clarity, let us call the main-lineage number obtained at step 60 MLN.

The pre-defined main-lineage table in the current invention may store, for example, the following slice of information:

00, 02, 05, 00, 02, 05, 01, 04, 07, 11, 08, 01, 09, 00, 10, 05

09, 06, 00, 06, 02, 07, 11, 06, 00, 02, 00, 06, 07, 02, 00, 02

05, 09, 06, 07, 02, 06, 11, 07, 08, 06, 10, 05, 02, 01, 08, 06

05, 04, 02, 01, 00, 11, 07, 06, 05, 04, 02, 06, 03, 02, 11, 00

02, 01, 00, 10, 00, 01, 02, 04, 05, 06, 04, 11, 00, 07, 06, 00

07, 09, 10, 11, 02, 04, 05, 08, 00, 01, 08, 06, 10, 04, 00, 09

02, 04, 05, 06, 07, 09, 10, 11, 00, 07, 09, 01, 06, 02, 06, 03

06, 05, 04, 02 00.

The structure of this embodiment of the table (and other tables described below) is influenced by the format of the data obtained from the TOC. In particular, the table is structured to facilitate conversion of the TOC data (which is recorded in a particular 16 notation method). As would be appreciated by one skilled in the art, a variety of techniques may be employed to process TOC information in practicing the teachings of the invention.

Furthermore, note that the only allowable values are between zero and eleven to account for the twelve main-lineage values. As would be appreciated by one skilled in the art, the logic in FIG. 3 and the structure of the table may be modified to allow for more than twelve main-lineage values, if desired.

Figure 4:
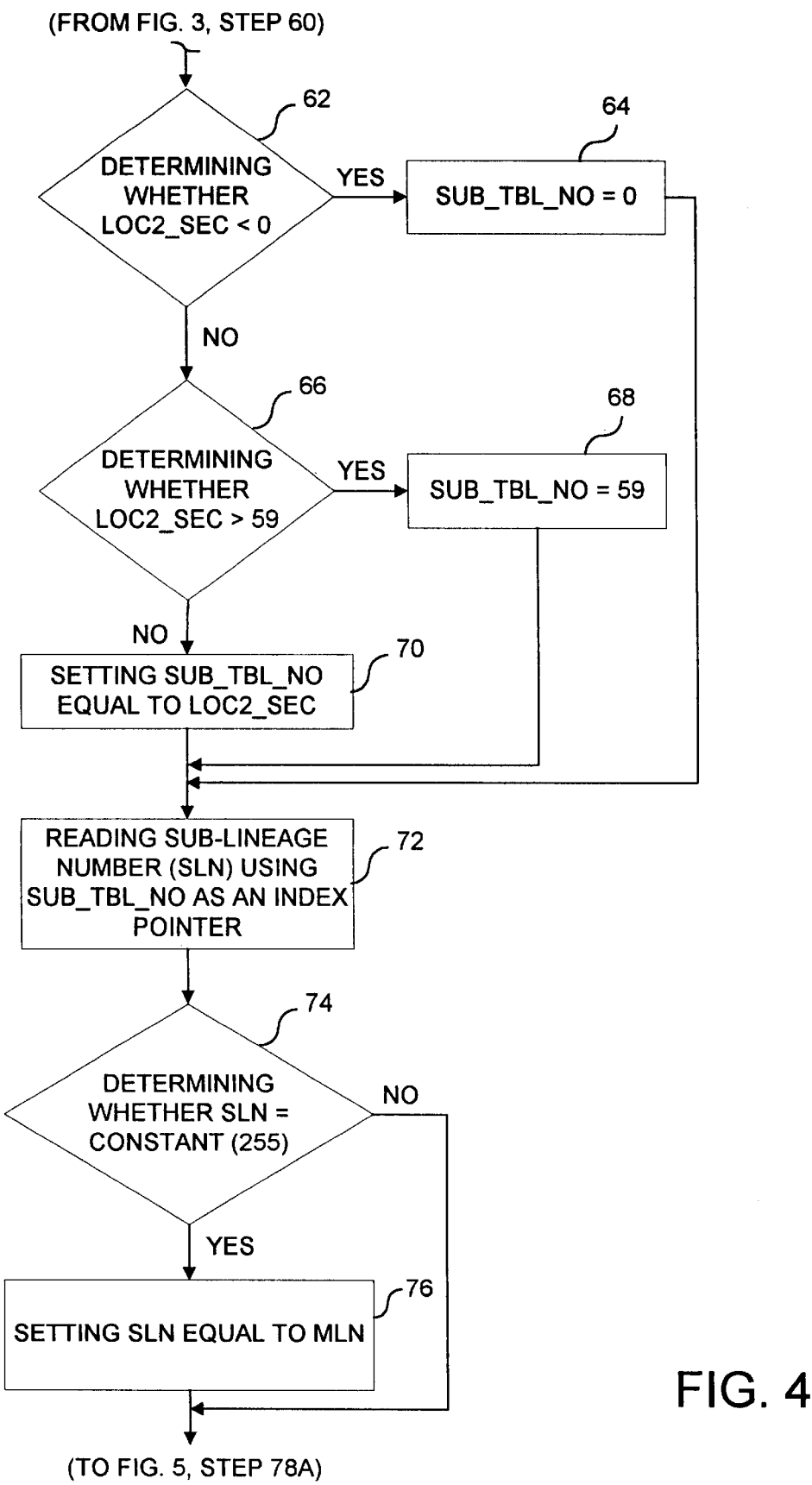
FIG. 4 is a flowchart illustrating steps subsequent to those shown in FIG. 3.

With reference now to FIG. 4, after the MLN is identified, a determination is made as to whether LOC2__SEC is less than zero, at step 62. If so, then the value for SUB__TBL__NO is set to zero, at step 64. If not, then a second determination is made, at step 66, whether LOC2__SEC is greater than fifty-nine. If greater than fifty-nine, then the value for SUB__TBL__NO is set to fifty-nine, at step 68. If not, then SUB__TBL__NO is set equal to the value of LOC2__SEC, at step 70. Because LOC2__SEC contains the remaining seconds of the second track, it holds value from zero to fifty-nine, that is, the allowable values for SUB__TBL__NO. This procedure serves as an error handling process, and may be applied when an error is detected, or when the inserted medium contains no TOC data. Using SUB__TBL__NO as an index or position holder, at step 72, the sub-lineage number (SLN) is then read from an existing predefined table containing sub-lineage values. The predefined table of sub-lineage values contains value from 0 to 11, to account for the twelve sub-lineage numbers predefined in the gaming environment, and the value two-hundred-fifty-five. In the illustrated embodiment, the constant value two-hundred-fifty-five is stored in the predefined table to allow for the content program to generate a genuine game character.

The predefined sub-lineage table in the current invention may store, for example, the following slice of information:

255,003,001,001,009,006,005,004,009,011,255,255,255, 255,255,255

011,010,007,008,006,004,006,002,006,009,255,255,255, 255,255,255

004,001,000,003,007,002,010,002,005,007,255,255,255, 255,255,255

008,005,010,009,001,006,011,010,007,008,255,255,255, 255,255,255

001,003,010,005,000,004,007,002,009,002,255,255,255, 255,255,255

004,011,000,003,000,008,005,011,000,003,255,255,255, 255,255,255

In this embodiment, the only allowable values in the table are between zero and eleven and the value two-hundred-fifty-five. Any person having ordinary skill in the art can easily modify the logic in FIG. 4 and the table structure to allow for a different number of sub-lineage values.

Further referring to FIG. 4, the method proceeds by determining, at step 74, whether the SLN is a constant, such as two-hundred-fifty-five. If it is so, the SLN is set equal to the MLN, obtained at step 60. In the disclosed embodiment, this test is used as one factor in the creation of a computer character. It should be appreciated, however, that many mapping variations may be used and that the invention is not limited to the disclosed embodiment. For clarity, let us call the sub-lineage number, obtained at either step 72 or 74, SLN.

Figure 5:
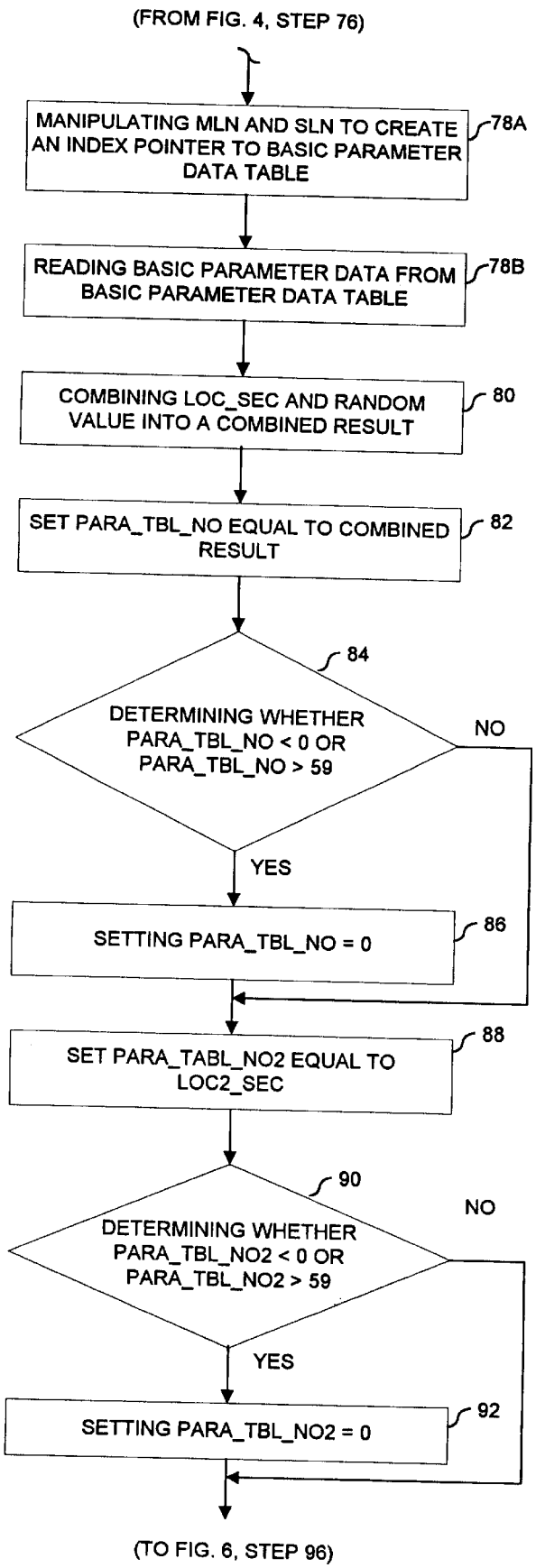
FIG. 5 is a flowchart showing steps subsequent to those shown in FIG. 4.

Referring now to FIG. 5, the MLN and SLN are manipulated to create a pointer or an index to a basic parameter table, at step 78A. The basic parameter table in this embodiment is an existing predefined table that contains one-hundred-forty-four rows with eleven columns in each row, with each row containing numerical information for one "custom" character that can be created in the gaming environment. The eleven columns in each row represent the numerical representation of the capacity parameters, such as Life, Power, Strength, Hitting Rate, Avoidance, Balance Restoring Speed, Smartness, Popularity, Honesty, Growth Type, and Variation Value of each "custom" character. Using the index created by manipulating MLN and SLN, that index pointer is then used to determine which row or particular game character's capacity parameters will be used by the program, at step 78B.

The predefined basic parameter table in the current invention may store, for example, the following slice of information (Note that the row numbers and the designations at the end of each row are not part of the data. In addition, the designations listed are merely examples of possible designations.):

|  |  | Main | Sub |
| --- | --- | --- | --- |
| Row 01 | 100, 120, 100, 140, 13, 100, 100, 000, 055, 000, 100 | Dragon | Dog |
| Row 02 | 100, 180, 110, 080, 15, 080, 100, 000, 055, 002, 100 | Dragon | Cat |
|  | . . . |  |  |
| Row 11 | 080, 080, 100, 160, 12, 140, 100, 000, 065, 001, 100 | Dog | Dog |
| Row 12 | 060, 100, 080, 150, 11, 130, 140, 000, 045, 000, 100 | Dog | Cat |
|  | etc. |  |  |

To obtain the index pointer for the predefined basic parameter data table, at step 78A, the MLN and SLN value may, for example, be concatenated together. For example, if the MLN is 1 (from the value 01) and the SLN is 1 (from the value 01), concatenating the MLN and SLN could result to a basic parameter table index of 11. If the basic parameter table index is 11, "Row 11" would be read from the basic parameter table (080, 080, 100, 160, 12, 140, 100, 000, 065, 001, 100). Any person having ordinary skill in the art can easily modify the logic in FIG. 4 and the table structure in the basic parameter table to allow for a different number of capacity parameters.

Further referring to FIG. 5, upon determining that particular game character's capacity parameters, the value for LOC__SEC is then added to a random number generated by the content program to produce a combined result, at step 80. Then, the value of PARA__TBL__NO is set equal to the prior combined result, at step 82. The method then determines, at step 84, whether PARA__TBL__NO is less than zero, or whether PARA__TBL__NO is greater than fifty-nine. If either condition is satisfied, then, at step 86, the value for PARA__TBL__NO is set to zero. If neither condition is satisfied, then the value for PARA__TBL__NO is left unmodified. Thus, the range of acceptable value for PARA__TBL__NO is between zero and fifty-nine. This procedure serves as an error handling process, and may be applied when an error is detected, or when the inserted medium contains no TOC data. PARA_TBL_NO is an index pointer that will determine which row of data will be read from the revision data table. The revision data table may be a predefined existing table containing revision data to allow changes to a game character's capacity parameters. This table contains sixty rows of information with eleven capacity parameters per row.

Further referring to FIG. 5, the value of PARA_TBL_NO2 is set equal to LOC2_SEC, at step 88. A determination is then made, at step 90, whether the value for PARA_TBL_NO2 is less than zero, or whether PARA_TBL_NO2 is greater than fifty-nine in much the same way as the steps above for the value of PARA_TBL_NO. If either condition matches, then the value of PARA_TBL_N02 is set to zero, at step 92. If no condition is satisfied, then the value for PARA_TBL_N02 is left unchanged. PARA_TBL_N02 is an index pointer that will determine what particular row of data in the revision data table will be read.

Figure 6:
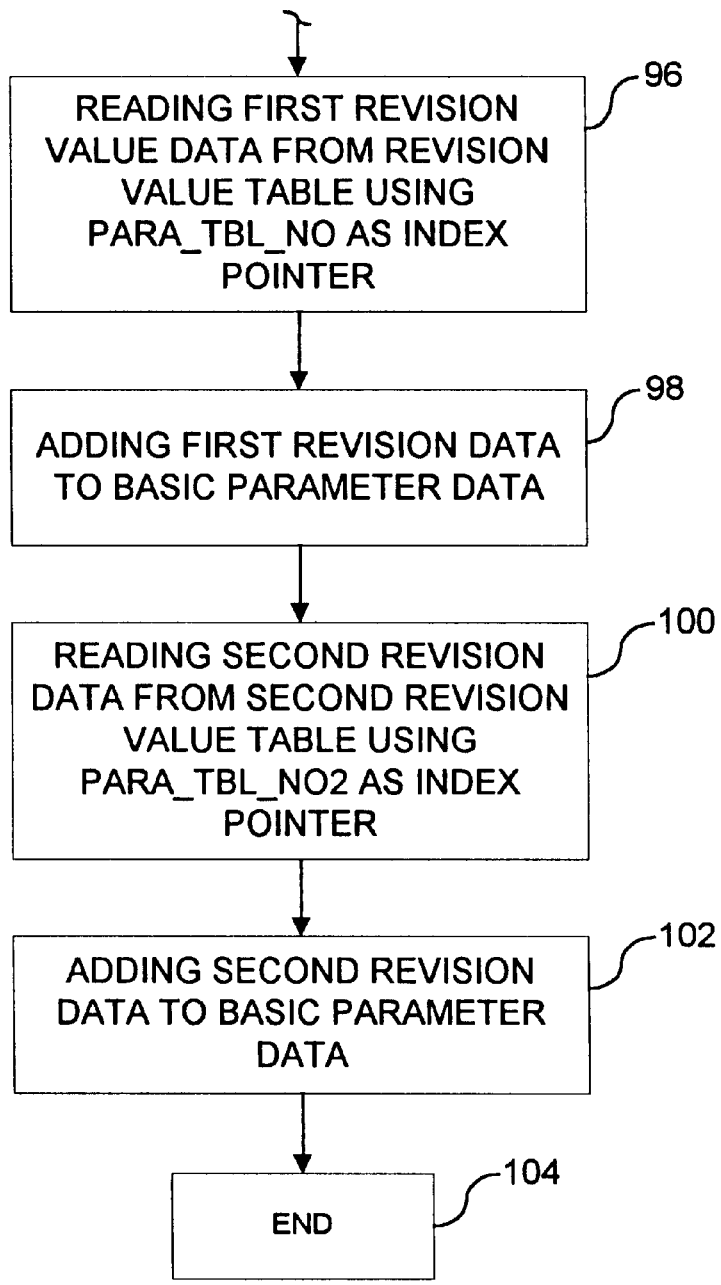
FIG. 6 is a flowchart illustrating steps subsequent to those shown in FIG. 5.

Referring now to FIG. 6, using PARA_TBL_NO as an index pointer, the first revision correction values are read from the revision correction table, at step 96. The first revision correction values and the basic parameter values read from step 78B are then combined, at step 98.

The predefined revision data table in the current invention may store, for example, the following slice of information ("Row #" within each row is not part of the data):

006, 009, –01, 004, 0, 008, 003, 000, 000, 000, 000 "Row 1"

008, 007, 007, –04, 0, 006, 004, 000, 000, 000, 000 "Row 2"

005, 010, 009, 001, 0, –09, 005, 000, 000, 000, 000 "Row 3"

006, 021, 005, 001, 0, 000, –06, 000, 000, 000, 000 "Row 4"

–05, 007, 001, 001, 0, 000, 007, 000, 000, 000, 000 "Row 5"

007, –01, 010, 001, 0, 009, 008, 000, 000, 000, 000 "Row 6" etc.

Thus, for example, if PARA_TBL_NO references row 2, the data that would be read, at step 96, from the predefined revision data table is "008, 007, 007, –04, 0, 006, 004, 000, 000, 000, 000." Using the basic parameter data obtained from step 78B, as discussed above, the two sets of data would be combined resulting to a new basic parameter data, at step 98.

080, 080, 100, 160, 12, 140, 100, 000, 065, 001, 100 "Data from Step 78B"

008, 007, 007, –04, 0, 006, 004, 000, 000, 000, 000 "Data from Step 96"

088, 087, 107, 156, 12, 146, 104, 000, 065, 001, 100 "Result of Step 98"

Then, using PARA_TBL_NO2 as an index or pointer, the second revision correction values are read from the revision correction table, at step 100. The second revision correction values and the new parameter values obtained in step 98 are then combined, at step 102. The combined new parameter data establishes the parameter data for the game character. The correction of the basic parameter data with the values obtained by using PARA_TBL_NO and PARA_TBL_N02 to obtain revision correction data provides significant variation in the resulting parameter values.

For example, if PARA_TBL_N02 references row 5, the data that would be read, at step 100, from the predefined revision data table is "–05, 007, 001, 001, 0, 000, 007, 000, 000, 000, 000." Using the new basic parameter data obtained from step 98, as discussed above, the two sets of data would be combined, at step 102, resulting to the basic parameter data that would be used in the game program.

088, 087, 107, 156, 12, 146, 104, 000, 065, 001, 100 "Result of Step 98"

–05, 007, 001, 001, 0, 000, 007, 000, 000, 000, 000 "Data from Step 100"

083, 094, 108, 157, 12, 146, 111, 000, 065, 001, 100 "Game Parameter Data"

Once the parameter values are assigned to a character, the game proceeds with the player having selective control over the character in a computer graphic adventure specific to the content generated by the game program.

Those skilled in the art will appreciate the many benefits and advantages offered by the present invention. Of significant importance is the adaptability and flexibility of the invention to provide a variety of computer graphic environments. In particular, the invention is not limited to game applications. Furthermore, as described in the present invention, it is possible to create data parameters which have no relation to the contents of the memory medium, e.g., an audio CD-ROM music contents bear no relation to the total number of tracks or the total time remaining in that CD-ROM. Accordingly, when the invention is incorporated into a game, because a game player is unable to know in advance what kind of parameter may be generated from a memory medium (such as an audio CD-ROM), the player's curiosity will be aroused, thereby encouraging game playing.

While the invention has been particularly shown and described with reference to the preferred embodiments thereof, it will be understood by those skilled in the art that various changes in form and detail may be made therein without departing from the spirit and scope of the invention.

For example, while CD-ROMs have been described herein as the preferred removable memory medium, other media may be utilized to generate the desired random data signals such as DVD-ROMs, CD-R discs, and MD discs. Moreover, it is also envisioned that magnetic media, such as conventional floppy discs, may be utilized since the header data represents the organizational structure of the data tracks, track sizes, and so forth. Furthermore, variations in the processing, the size of the data tables, and data contained in the tables can also be done.

What is claimed is:

1. A method of extracting random data for use in an interactive computer graphical environment, said graphical environment generated by a computer responsive to software residing on a first removable memory, said first removable memory having a predetermined data format, said method including the steps of:

selecting a second memory having a substantially similar data format to said predetermined data format;

reading data signals from said randomly selected second memory indicative of the content thereon; and processing said read data signals to represent parameter content in said graphical environment.

2. A method according to claim 1 wherein said randomly selecting step includes:

providing a second memory comprising the same data storage medium as said first memory.

3. A method according to claim 2 wherein said first memory comprises a CD-ROM and said randomly selecting step includes:

choosing a second CD-ROM.

4. A method according to claim 3 wherein said reading step includes:

reading table-of-content (TOC) data from said second CD-ROM.

5. A method according to claim 1 wherein said first memory includes predetermined parameter values and data signal thresholds and said processing step includes the steps of:

comparing said read data signals to said data signal thresholds; and selecting either said predetermined parameter values or random parameter values from said read data signals based on said comparison.

6. A method according to claim 5 wherein said comparing step includes the step of:

detecting errors in said read data signals; and automatically utilizing said predetermined parameter values if said errors are detected.

7. A method of randomly generating content parameters for use by a computer, said computer having a reader for receiving a first removable memory including predetermined computer content, said reader operative in response to said content to generate a computer graphics environment, said method including the steps of:

selecting a second removable memory including data representative of the formatting characteristics of said second memory;

temporarily replacing said first removable memory in said reader with said second memory;

extracting said formatting data from said second memory with said reader;

processing said extracted data to create parameter values for use by said computer content; and substituting said second memory for said first memory in said reader to continue processing of said computer content.

8. A system for displaying computer content on a graphics display, said computer content resident on a first removable memory, said system including:

a reader operative to read data signals from said first removable memory comprising said computer content, said reader responsive to instructions in said computer content to extract organizational data signals from a randomly selected second removable memory; and a processor coupled to said reader for generating parameter data from said extracted organizational data signals for use in said computer content.

9. A system according to claim 8 wherein:

said first and second removable memories comprise respective first and second CDROM's.

10. A system according to claim 9 wherein:

said organizational data signals from said second CDROM comprise TOC data signals.

* * * * *